(12) United States Patent
Uozumi et al.

(10) Patent No.: US 6,346,884 B1
(45) Date of Patent: Feb. 12, 2002

(54) APPARATUS FOR IDENTIFYING AN ARTICLE

(75) Inventors: Gakuji Uozumi; Osamu Ishihara, both of Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/533,935

(22) Filed: Mar. 23, 2000

(51) Int. Cl.[7] .............................................. G08B 13/14
(52) U.S. Cl. ................. 340/572.1; 340/572; 340/572.4; 340/572.5; 340/825.3; 340/825.54; 340/988
(58) Field of Search ........................... 340/572, 825.3, 340/825.54, 988, 572.4, 572.5; 455/73, 106, 85, 86, 88

(56) References Cited

U.S. PATENT DOCUMENTS

| 5,557,279 | A | * | 9/1996 | D'Hont | 340/572 |
| 5,625,341 | A | * | 4/1997 | Giles et al. | 340/572 |
| 6,045,652 | A | * | 7/1998 | Tuttle et al. | 340/825.54 |
| 5,842,118 | A | * | 11/1998 | Wood, Jr. | 455/101 |
| 5,850,187 | A | * | 12/1998 | Carrender et al. | 340/572 |
| 5,952,922 | A | * | 9/1999 | Shober | 340/572.4 |
| 6,107,910 | A | * | 8/2000 | Nysen | 340/10.1 |

FOREIGN PATENT DOCUMENTS

GB  2 274 373  7/1994
WO  WO 99/33017  7/1999

OTHER PUBLICATIONS

Patent Abstracts of Japan, vol. 1999, No. 07, Mar. 31, 1999, JP 08 316888, Nov. 29, 1996.

* cited by examiner

*Primary Examiner*—Jeffery Hofsass
*Assistant Examiner*—Hung Nguyen
(74) *Attorney, Agent, or Firm*—Oblon, Spivak, McClelland, Maier & Neustadt, P.C.

(57) ABSTRACT

An apparatus for identifying an article including an interrogator to enable a tag to be identified, even if the tag is overlapped with another tag or a metal plate. The tag is attached to the article, and a memory for storing data about the article is provided in an RFID element connected to an antenna coil of the tag. The tag is activated by transmitting a radio wave of a frequency with which the tag resonates from a transmitting/receiving antenna of the interrogator. Data is read from the memory in response to a reading command, and data is writing into the memory in response to a writing command from the interrogator. The interrogator also includes an oscillation circuit for sweeping a radio wave transmitted from the transmitting/receiving antenna over a predetermined frequency range. The predetermined frequency range is a frequency range which includes all resonance frequencies of a plurality of the tags that vary based on plurality of overlapped articles to which the tags are attached.

9 Claims, 7 Drawing Sheets

APPARATUS FOR IDENTIFYING AN ARTICLE

BACKGROUND OF THE INVENTION

1. Field of the Invention

The present invention relates to an apparatus for identifying an article using a RFID (Radio Frequency Identification) technique. More particularly, the present invention relates to an apparatus for identifying an article, by attaching a tag having the RFID element to an article, and then interrogating the tag with an interrogator.

2. Discussion of the Background

Conventionally, a tag identifying system includes a single two-way communication channel provided between an interrogator and a plurality of tags within a range of the interrogator. Initially, the identifications of the tags are not known to the interrogator. The tags are activated when the interrogator responds to a signal of a single frequency, and each tag is enabled to inactivate itself (Japanese Unexamined Patent Publication No. 8-316888). In this tag identifying system, during the first broadcast the interrogator broadcasts a first inquiry message including a first signal used for activating all tags within the range of the interrogator and a first value indicating the number of the tags within a range of the interrogator. In addition, a storage unit provided for each tag stores into a memory an identification record not identified by the interrogator by responding to the first inquiry message.

Further, a first residual tag forming unit provided in each tag performs respective calculations based on the first value, random bits for each tag, and the stored identification record in response to a reception of the first inquiry message. The tags are inactivated when the respective calculations result in predetermined consequences, so as to form a first group of activated residual tags. After a first inactivating unit for identifying each tag activated in the first group has modified the identification record stored in the memory of each tag in the first group indicating an identification by the interrogator has succeeded, the first group of tags are inactivated.

Moreover, after the first broadcast, the interrogator broadcasts a second inquiry message including a second signal that activates all tags within the range of the interrogator and a second value indicating the number of the unidentified tags within the range of the interrogator. The second value is used in place of the first value. Further, a second residual tag forming unit and a second inactivating unit performing the same processes as the first residual tag forming unit and the first inactivating unit, and form a second group of activated residual tags so as to increase the number of identified tags. Further, the processes preformed by the second broadcasting unit, the second residual tag forming unit, and the second inactivating unit use the inquiry message having a next signal and a next value until the identification of all tags within the range of the interrogator is complete.

In the above-described tag identifying system, the tags are divided into small groups, and the tags of one group are identified at one time so as to save electrical power by turning off the power supply for the tags not belonging to the group which is presently being identified. Each tag enters the group by performing a calculation with a parameter stored in the tag and a parameter received from the interrogator.

However, in the tag identifying system disclosed in the Japanese Unexamined Patent Publication No. 8-316888, when the tag overlaps with another tag and/or a metal plate, a mutual induction (inducing action) is generated between an antenna coil of the tag and an antenna coil of the other tag or the metal plate. Thus, a resonant frequency of the tag changes. Consequently, the tag no longer oscillates, even if the interrogator forms an alternating magnetic field in the surroundings thereof, i.e., even if a radio wave with which the tag (the tags do not overlap with each other) resonates is transmitted from the transmitting/receiving antenna of the interrogator, and electrical power is no longer supplied to the RFID element of the tag. As a result, a problem occurs because the interrogator can't identify overlapping tags.

SUMMARY OF THE INVENTION

Accordingly, it is an object of the present invention to provide a novel apparatus for identifying an article, in which an interrogator is able to identify a tag, even if the tag overlaps with another tag or a metal plate.

This and other objects are achieved by providing a novel apparatus for identifying an article including a tag attached to the article. The tag has an antenna coil and a RFID element connected to the antenna coil. The RFID element includes a memory for storing data about the article. Also included is an interrogator for activating the tag by transmitting a radio wave having a frequency with which the tag resonates from a transmitting/receiving antenna, and for generating a response signal from the tag by reading data from the memory in response to a reading command, and by writing the data into the memory in response to a writing command. The interrogator includes an oscillation circuit for sweeping a radio wave transmitted from the transmitting/receiving antenna over a predetermined frequency range. The predetermined frequency range is a frequency range which includes all varied resonance frequencies for a plurality of overlapped tags (i.e., the articles having the tags are overlapped). The predetermined frequency range may also be a frequency range which includes all varied resonance frequencies for tags disposed near metal objects, such as coins.

Individually, each of the plurality of tags has the same resonant frequency. However, each tag has a different resonant frequency according to the mutual induction of the antenna coils of the tags between each other. That is, when the plurality of tags are overlapped, each tag has an intrinsic resonant frequency determined by a distance from other overlapped tags or an arrangement thereof.

As a result, according to the present invention, the frequency of an alternating magnetic field formed by the interrogator (the radio wave transmitted by the interrogator) is varied such that all of the overlapped plurality of tags resonate. That is, all of the overlapped plurality of tags can be identified as the oscillation circuit sweeps an oscillation frequency over the frequency range which includes the resonant frequencies of all the superposed plurality of tags from the one with the minimum value to the one with the maximum value.

Further, when at least one tag and at least one metal plate are overlapped, because each tag has an intrinsic resonant frequency determined by a distance from other overlapped tags and metal plates, the frequency of an alternating magnetic field formed by the interrogator (the radio wave transmitted by the interrogator) is varied such that all of the superposed plurality of tags resonate. That is, all of the superposed plurality of tags can be identified, as the oscillation circuit sweeps an oscillation frequency over the frequency range which includes the resonant frequencies of all the superposed tags and metal plates from the frequency with the minimum value to the frequency with the maximum value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
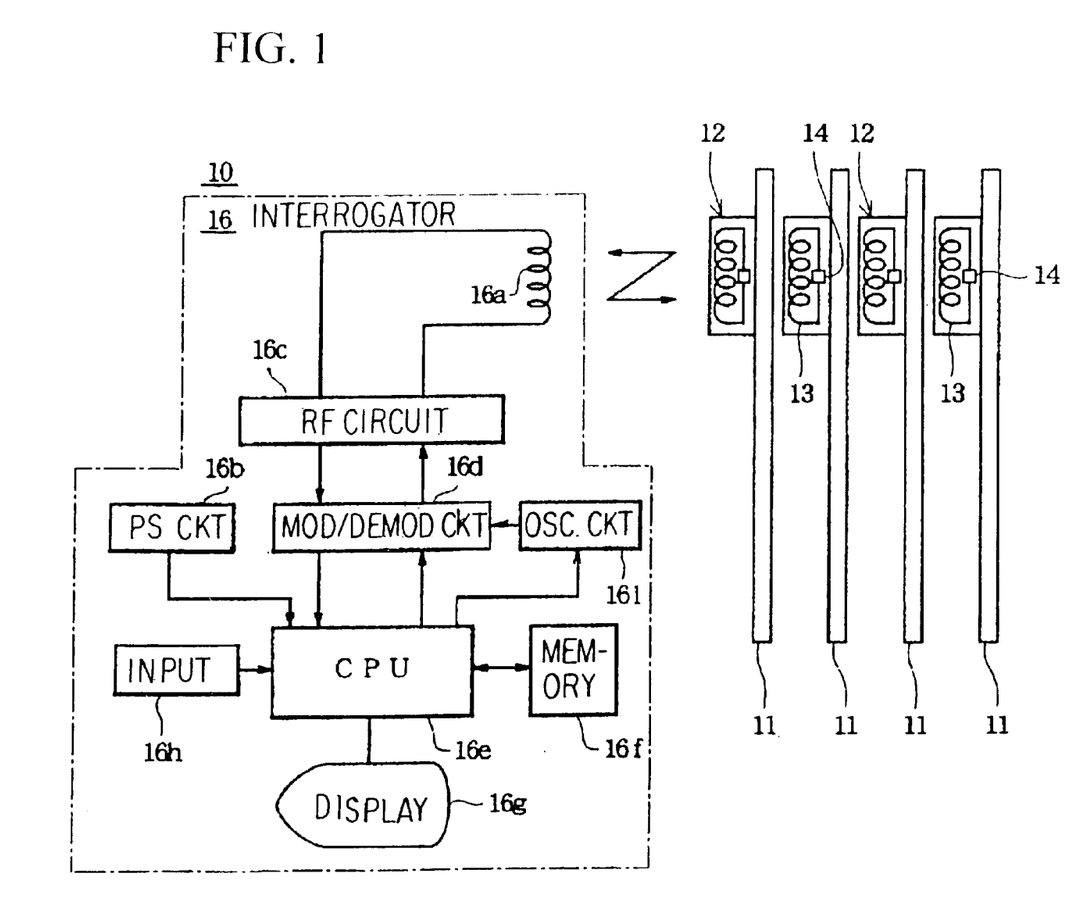
FIG. 1 is a schematic showing an apparatus for identifying an article according to a first embodiment of the present invention.
Figure 3:
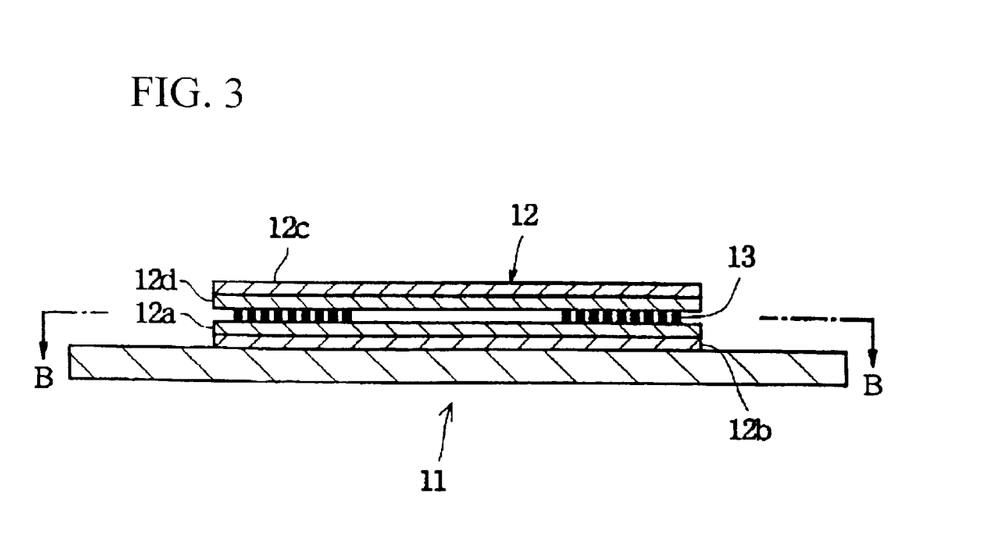
FIG. 3 is a cross-sectional view along the line A–A' in FIG. 4 showing a state in which the tag is attached to an article.
Figure 4:
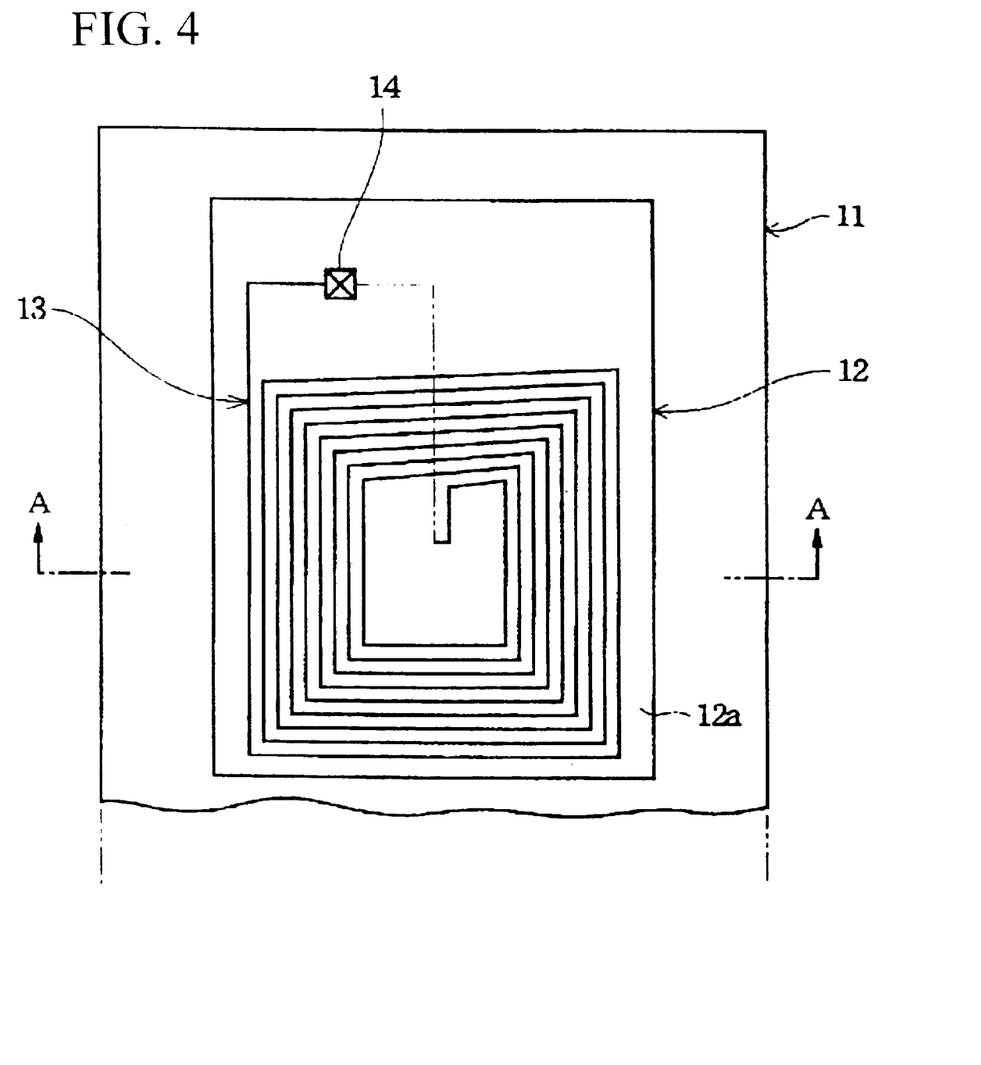
FIG. 4 is a cross-sectional view along the line B–B' in FIG. 3.

Referring now to the drawings, wherein like reference numerals designate identical or corresponding parts throughout the several views, FIG. 1 shows an apparatus 10 for identifying an article 11 including a tag 12, which is attached to the article 11. The tag 12 includes an antenna coil 13 and a RFID element 14 connected to the antenna coil 13. Also shown is an interrogator 16 which activates (resonates) the tag 12 by transmitting a radio wave from a transmitting/receiving antenna 16a. The antenna coil 13 is, as shown in detail in FIGS. 3 and 4, formed by winding an insulated conductor in an approximately square spiral shape and by pasting it to a base plate 12a. Alternatively, the antenna coil 13 may be formed in an approximately square spiral shape by removing, with an etching method, a punching method, etc., an unwanted part of a conductive material such as an aluminum foil, a copper foil, and the like, laminated on the base plate 12a.

Figure 2:
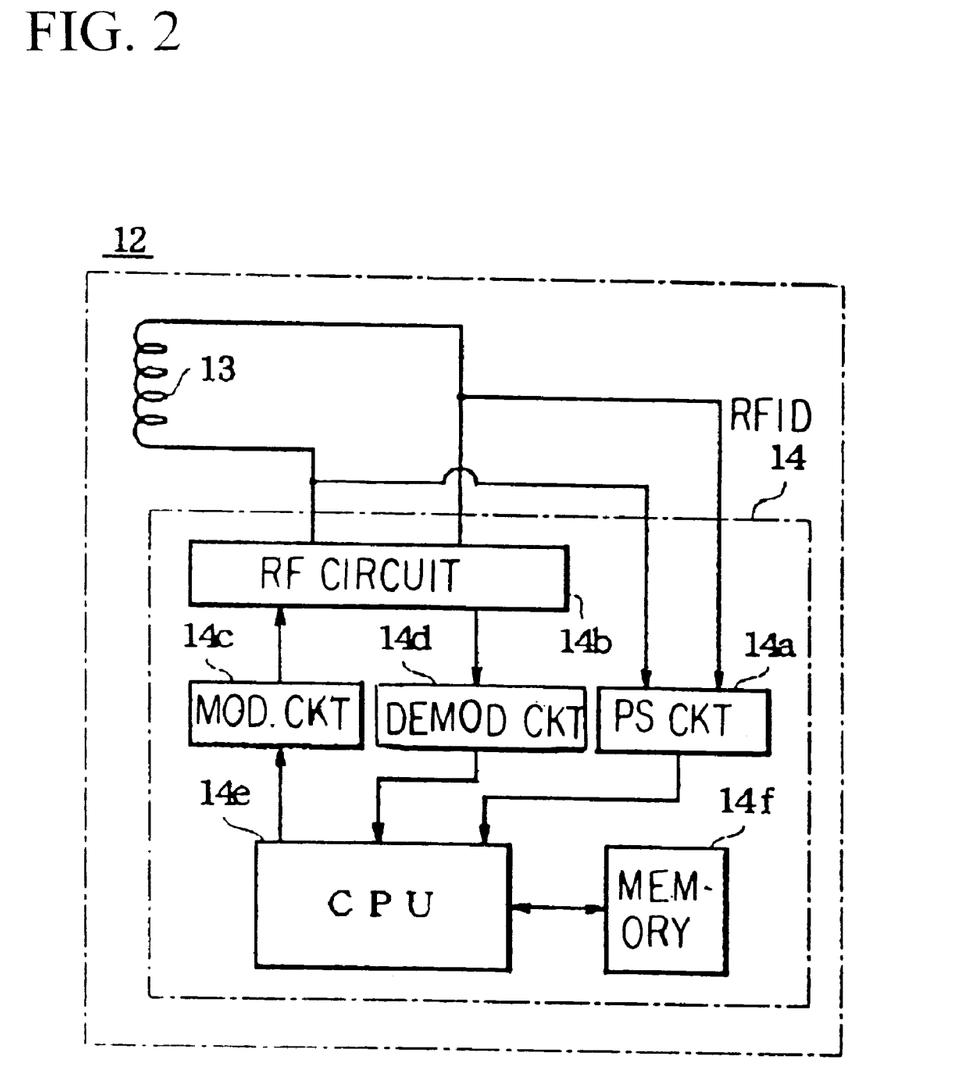
FIG. 2 is a schematic of a RFID element of a tag.

The RFID element 14 is pasted to the base plate 12a (FIG. 4), and includes a power supply circuit 14a, a radio frequency (RF) circuit 14b, a modulation circuit 14c, a demodulation circuit 14d, a CPU 14e, and a memory 14f for storing data about the attached article (FIG. 2). The power supply circuit 14a includes a capacitor (not shown). Further, the capacitor and the antenna coil 13 form a resonance circuit. In the present embodiment, the RFID element 14 has no battery. As a result, electrical power generated by electromagnetic induction charges the capacitor when the antenna 13 receives a radio wave of a predetermined resonance frequency. The power supply circuit 14a rectifies and stabilizes the electrical power and then supplies it to the CPU 14e, so as to activate the RFID element 14.

The memory 14f of the RFID element 14 includes a ROM (Read Only Memory), a RAM (Random Access Memory), a non-volatile memory, and the like. The CPU 14e reads data stored in the memory 14f in response to a reading command from the interrogator 16. Data is also written to the memory 14f in response to a write command from the interrogator 16.

The article 11 may be, for example, a registered mail envelope containing only paper money (not shown). In this case, data such as the amount of cash enclosed in the envelope 11, the name of the post office that delivers the envelope 11, the name of the postman, the date and time of arrival or departure of the envelope 11, etc., is stored in the memory 14f of the RFID element 14. Further, the symbol 12b in FIG. 3 denotes a first adhesive layer for pasting the base plate 12a on a surface of the article 11, and the symbol 12c denotes a cover layer for covering the antenna 13 and the RFID element 14 on the base plate 12a. The symbol 12d denotes a second adhesive layer for pasting the cover layer 12c on the base plate 12a.

The interrogator 16 is a RFID controller, and includes the transmitting/receiving antenna 16a, a power supply circuit 16b, a radio frequency (RF) circuit 16c, and a modulation/demodulation circuit 16d (FIG. 1). Further, a memory 16f, a display 16g, and an input unit 16h are connected to a CPU 16e. Also included is an oscillation circuit 16i for sweeping a radio wave transmitted from the transmitting/receiving antenna 16a in a predetermined frequency range. The predetermined frequency range is a frequency range including all of the resonance frequencies for the overlapping tags 12, which vary because the tags are overlapped (see FIG. 1).

One example of a method of identifying the article 11 including an attached tag 12 according to the interrogator 16 will now be described.

In this example, the article 11 is a registered mail envelope including only paper money and the attached tag 12. Data about the article, such as the amount of the money enclosed in the envelope 11, the name of the post office that delivers the envelope 11, the name of the postman, the date and the time of arrival or departure of the envelope 11, etc., is stored in the memory 14f. When a radio wave is transmitted from the transmitting/receiving antenna 16a toward the antenna coils 13 of the overlapped envelopes 11 having the tags 12 (i.e., when a plurality of envelopes 11 are in a bundle), a mutual induction is generated between the antenna coils 13 of each tag 12. Thus, the resonance frequency of each tag 12 varies.

For example, consider an RLC circuit including a resistor and a capacitor respectively connected in parallel to the antenna coil 13. When a self-inductance L of the antenna coil 13 is 7.70 mH, a copper loss r of the antenna coil is 700Ω, a capacitance C of the capacitor is 210 pF, and a resistance R of the resistor is 60 kΩ. A resonance frequency f1 of the RLC circuit is obtained from the equation shown below:

$$f1 = \left(\frac{1}{2\pi}\right)\left[\frac{1}{LC} - \left(\frac{1}{CR}\right)^2\right]^{1/2} = 125 \text{ kHz}$$

On the other hand, when two of the RLC circuits identical to the one described above overlap, a resonance frequency f2 of the RLC circuit is obtained from the equation shown below:

$$f2 = \left(\frac{1}{2\pi}\right)\left[\frac{1}{(L+M)C} - \left(\frac{1}{CR}\right)^2\right]^{1/2} = 96 \text{ kHz}$$

The frequency f2 is less than f1. That is, an apparent self-inductance L increases to (L+M).

Moreover, a distance between the two antenna coils is a little less than 1 mm, and the mutual inductance M of the two antenna coils in this case is 5.1 mH. Further, the copper loss r has no influence on the resonance frequencies f1 and f2.

The CPU 16e of the interrogator 16 causes a radio wave (a carrier wave on which an interrogation signal is carried)

to be transmitted from the transmitting/receiving antenna 16a. The radio wave includes all of the resonance frequencies for the overlapped tags 12 by sequentially changing the frequency of the carrier wave with the oscillation circuit 16i. Further, the interrogation signal is a binary digital signal and is generated from a signal generator (not shown) of the interrogator 16. The digital signal is carried on a carrier wave of a predetermined frequency by the modulation circuit of the modulation/demodulation circuit 16d. That is, the signal is modulated. In the RF circuit 16c, the modulated signal is amplified and then transmitted from the transmitting/receiving antenna 16a. The modulation is, for example, ASK (amplitude modulation), FSK (frequency modulation), or a PSK (phase modulation).

The radio wave is received at the antenna coil 13 of the tag 12 having a resonance frequency resonating with the above-mentioned predetermined frequency. The interrogator 16 suspends the sweeping of the frequency when the predetermined tag 12 receives the radio wave as described above, and reads the intrinsic information stored in the memory 14f of the RFID element 14. That is, upon reception by the predetermined tag 12, electrical power generated by electromagnetic induction charges a capacitor of the power supply circuit 14a. The power supply circuit 14a rectifies and stabilizes the electrical power and supplies it to the CPU 14e so as to activate the RFID element 14. Then, in the RF circuit 14b of the RFID element 14, only a signal necessary for demodulation is taken. In addition, in the demodulation circuit 14d, the interrogation signal of the original digital signal is reproduced and the data of the envelope 11, such as the amount of money enclosed in the envelope 11 and the like, is transmitted from the memory 14f to the interrogator 16. Transmission of this data is implemented, for example, by modulating the digitized amount of money enclosed with the modulation circuit 14c of the RFID element 14, by amplifying it with the RF circuit 14b, and by transmitting it from the antenna coil 13.

Then, in the interrogator 16 receiving the data, the information about the envelope 11 can be confirmed with a display 16g, for example. In addition, data (e.g., the date and time, and the name of the post office that reads the information about the envelope 11) may be input from the input mechanism 16h. The data is then transmitted to the tag 12 and stored in the memory 14f of the RFID element 14.

After the data is stored in the memory 14f, the interrogator 16 resumes the above-mentioned suspended sweeping of the frequency. That is, the frequency of the radio wave (i.e., the carrier wave on which the interrogation signal is carried) transmitted from the transmitting/receiving antenna 16a is sequentially changed by the oscillation circuit 16i. In addition, this radio wave is sequentially received at the antenna coils 13 of the tags 12 having the resonance frequency resonating with a predetermined frequency. Then, the interrogator 16 suspends the sweeping of the frequency when another tag 12 resonates with a radio wave of another frequency. Similarly to that described above, the interrogator 16 reads data stored in the memory 14f of the RFID element 14, and also writes predetermined data into the memory 4f.

As described above, a frequency of an alternating magnetic field formed by the interrogator 16 is changed such that when a plurality of tags 12 overlap, all of the tags 12 resonate. That is, the oscillation circuit 14i sweeps the oscillation frequency with the frequency range of all the varied resonance frequencies of the overlapped tags 12 from the one with the minimum value to the one with the maximum value. As a result, the interrogator 16 can identify all of the overlapped tags 12.

Figure 5:
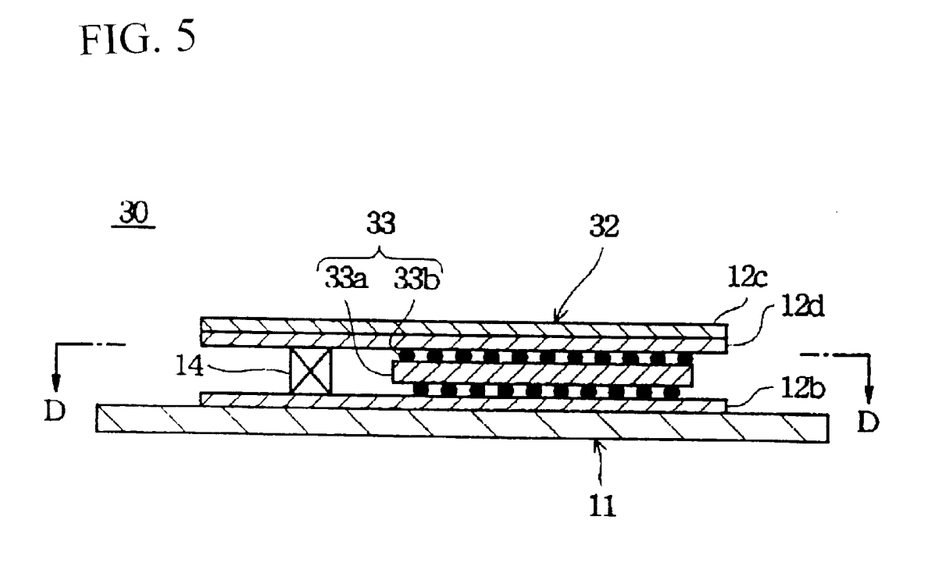
FIG. 5 is a cross-sectional view along the line C–C' in FIG. 6 showing a second embodiment of the present invention.
Figure 6:
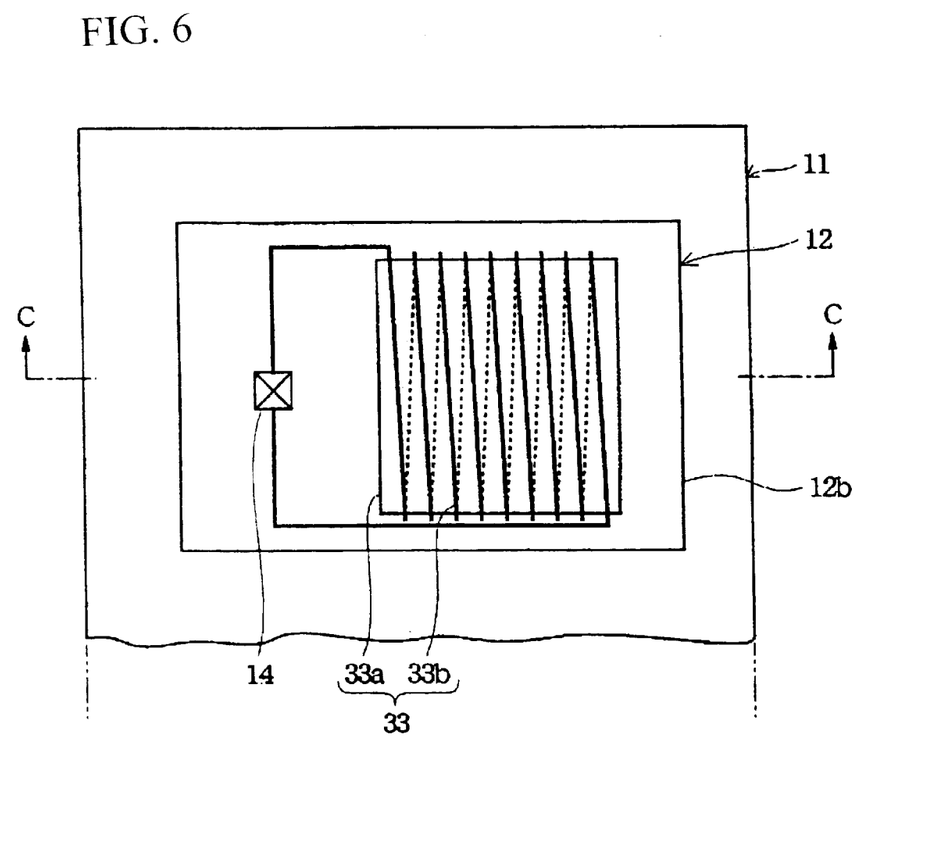
FIG. 6 is a cross-sectional view along the line D–D' in FIG. 5.

FIGS. 5 and 6 show a second embodiment of the present invention. In FIGS. 5 and 6, the same symbols as in FIGS. 3 and 4 denote the same parts.

In this embodiment, an antenna coil 33 includes a magnet core having a magnetic material 33a, and a coil body 33b wound around the magnetic material 33a. For the shape of the magnetic material 33a, a plate, a cylinder, a solid prism, a hollow cylinder, etc., may be used. The hollow cylinder may be one in which the cylinder is formed by assembling a plurality of arc-shaped plate pieces, or one in which the cylinder is formed by a thin film or foil. Further, as the magnetic material 33a, the following may be used: (1) a laminated body having a plurality of thin films or thin plates of a soft magnetic metal and a plurality of insulating thin films alternately overlapped, or a laminated body in which a plurality of thin films or thin plates of a soft magnetic metal are overlapped such that surfaces thereof are insulated; (2) a composite material of a powder or flakes of a soft magnetic metal and plastics; (3) a composite material of a powder or flakes of a soft magnetic metal, a powder of ferrite, and plastics; (4) a composite material of a powder of ferrite and plastics; and (5) a sintered ferrite, and the like. Among the magnetic materials, it is preferable to use a soft magnetic metal in which the magnetic permeability is not changed according to the surrounding temperature and in which the resonance frequency is not changed when an antenna coil forms the resonance circuit. Also, it is preferable that a shape thereof is a thin film, a powder or flakes, so that the resonance characteristics are not degraded (i.e., preventing an eddy current from generating when the resonance frequency is high).

In addition, it is preferable to use a film of 5 to 250 $\mu$m in thickness formed with an iron type amorphous alloy, a cobalt type amorphous alloy, a permalloy, or silicon steel. For the soft magnetic metal thin film of the above-mentioned material (1), it is preferable to use an insulating resin film of 5 to 50 $\mu$m in thickness, such as a polyester film, a polyvinylidene chloride, a polyvinyl chloride, a polyethylene terephthalate, and the like. Further, the insulating thin film may be an insulating paper. For the powders of soft magnetic metal in the above-mentioned materials (2) and (3), it is preferable to use a carbonyl iron dust or a reduced iron dust. Moreover, for the flakes of soft magnetic metal, it is preferable that after having formed a powder of a soft magnetic metal by refining iron, a permalloy, an amorphous alloy, and the like using the atomize method, flakes of 0.1 to 10 $\mu$m in thickness are obtained by mechanically flattening the powder of soft magnetic metal. The other parts are formed similarly to the first embodiment.

The operation of the identifying apparatus 30 of the article 11 as described above is approximately the same as that in the first embodiment, and thus a repeated description will be omitted.

Figure 7:
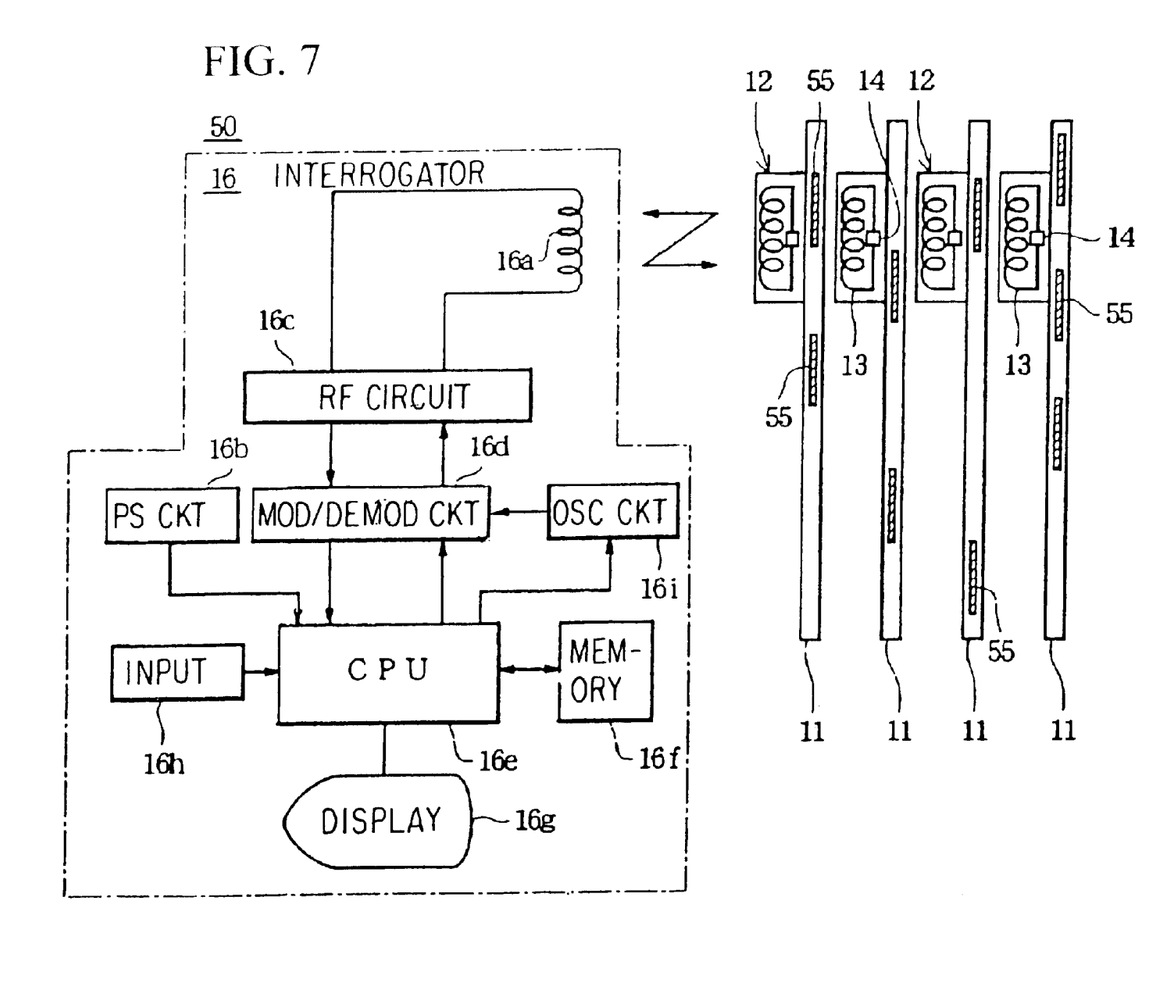
FIG. 7 is a schematic corresponding to FIG. 1 showing a third embodiment of the present invention.

FIG. 7 shows a third embodiment of the present invention. In FIG. 7, the same symbols as those in FIG. 1 denote the same parts. In this embodiment, one or more metal plates 55 are superposed on one or more articles 11 to which the tags 12 are attached. For example, as well as paper money, coins 55 may be enclosed in a registered mail envelope. In this case, the coins 55 correspond to the above-mentioned metal plate. The other parts are formed similarly to the first embodiment.

In an identifying apparatus 50 described above, apart from the fact that the resonance frequency of each tag 12 further varies because of the existence of the coin 55 (metal plate), the operation is substantially the same as that in the first embodiment, and thus a repeated description will be omitted.

Further, in the first to third embodiments, the article is a registered mail envelope.

However, the article may be a check, securities, a postcard, or other articles so long as the overlapped articles include the tags. Moreover, in the third embodiment, the metal plate may include a coin, but it may be aluminum foil or another metal plate pasted, etc., to an envelope. Further, in the first to third embodiments, an RFID element without a battery is mentioned, but an RFID element having a battery may also be used.

In the following, the embodiments of the present invention will be described in detail with comparative examples.

EXAMPLE 1

Ten sheets of identical tags were manufactured, each of which resonated at 125 kHz, and these tags were overlapped at an interval of 1 mm. The frequency was varied by the oscillation circuit in the interrogator, and radio waves were transmitted from the transmitting/receiving antenna toward the overlapped tags.

As a result, when the frequency was swept over the range of 70 kHz to 125 kHz by the oscillation circuit, all of the overlapped tags were identified.

EXAMPLE 2

One hundred sheets of identical tags were manufactured, each of which resonated at 125 kHz individually. Provided in the tags were switches for controlling currents flowing through the antenna coils. That is, the switch was formed so as to turn off when communication between the interrogator and the tag was completed. Radio waves were transmitted from the transmitting/receiving antenna toward the one hundred tags by varying the frequency from 40 kHz to 130 kHz with the oscillation circuit of the interrogator. As a result, the first tag (of the first sheet) was identified when the frequency was at 47 kHz, and by gradually increasing the frequency, the last tag (of the 100th sheet) was identified when the frequency was at 125 kHz.

Comparative Example 1

One tag sheet resonating at 125 kHz was manufactured. While transmitting a radio wave with a constant frequency of 125 kHz from the transmitting/receiving antenna toward the tag, the maximum distance over which an antenna coil of the tag resonated was measured by gradually separating the tag from the interrogator. As a result, the maximum distance over which the antenna coil of the tag resonated was 52 cm.

Comparative Example 2

Two sheets of tags resonating at 125 kHz were manufactured. When the tags were overlapped with an interval of 1 mm the maximum distance over which an antenna coil of the tag resonated was measured by gradually separating the tag from the interrogator while transmitting a radio wave having a frequency of 125 kHz. As a result, the maximum distance over which the antenna coil of the resonating tag was substantially reduced to 1.5 cm compared to comparison example 1.

Comparative Example 3

Three sheets of tags resonating at 125 kHz were manufactured. When these tags were overlapped with an interval of 1 mm, the maximum distance over which an antenna coil of the tag resonated was measured by gradually separating the tag from the interrogator while transmitting a radio wave of a frequency of 125 kHz. As a result, when the overlapped tags were placed in the vicinity of the transmitting/receiving antenna, in which the magnetic field intensity was large, two tags at both ends could be identified because a mutual induction due to the overlapping was relatively small, but the tag in the middle could not be identified because a mutual induction due to the overlapping was relatively large.

As described above, according to the present invention, the interrogator includes the oscillation circuit which is configured to sweep the radio wave transmitted from the transmitting/receiving antenna over a predetermined frequency range. The predetermined frequency range includes all of the varied resonance frequencies of the overlapped tags. In addition, when the tags are overlapped, the frequency of the alternating magnetic field formed by the interrogator is varied such that all of the overlapped tags resonate. That is, the oscillation circuit sweeps the oscillation frequency over the frequency range which includes the resonant frequencies of all the superposed tags from the one with the minimum value to the one with the maximum value. As a result, the interrogator enables all of the superposed tags to be identified.

Further, the interrogator may also be configured to sweep the radio wave transmitted from the transmitting/receiving antenna over a predetermined frequency range, which includes all of the varied resonance frequencies of one or more overlapped tags and metal plates. When one or more tags and metal plates are overlapped, the frequency of the alternating magnetic field formed by the interrogator is varied such that all of the overlapped plurality of tags resonate. That is, the oscillation circuit sweeps the oscillation frequency over the frequency range which includes the varied resonance frequencies the overlapped tags from the one with the minimum value to the one with the maximum value. As a result, similarly to above, all of the superposed tags can be identified.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for identifying an article, comprising:
    at least one tag configured to be attached to the article and having an antenna coil and a RFID element connected to the antenna coil; and
    an interrogator configured to activate the tag by transmitting a radio wave with which the at least one tag resonates from a transmitting/receiving antenna, and configured to read and write data about the article to and from a memory of the RFID element,
    wherein the interrogator includes an oscillation circuit configured to sweep the radio wave transmitted from said transmitting/receiving antenna over a first predetermined frequency range including each resonant frequency of the at least one tag attached to a plurality of overlapped articles, and
    wherein the first predetermined range of frequencies includes a resonance frequency of each tag which varies based on a mutual inductance occurring between the antenna coils of overlapped tags.

2. The apparatus according to claim 1, further comprising:
    a metal object attached to the article,
    wherein the oscillation circuit sweeps the radio wave over a second predetermined frequency range including each resonant frequency of the at least one tag attached to a plurality of overlapped articles having the metal object.

3. The apparatus according to claim 2, wherein the second predetermined range of frequencies includes a resonance frequency of each tag which varies based on a mutual inductance between the antenna coils of overlapped tags and the metal object.

4. A method of identifying an article, comprising:

attaching to the article a tag having an antenna coil and a RFID element connected to the antenna coil;

activating the tag by transmitting a radio wave with which the at least one tag resonates from a transmitting/receiving antenna;

reading and writing data about the article to and from a memory of the RFID element; and sweeping the radio wave transmitted from said transmitting/receiving antenna over a first predetermined frequency range including each resonant frequency of the at least one tag attached to a plurality of overlapped articles, and wherein the first predetermined range of frequencies includes a resonance frequency of each tag which varies based on a mutual inductance occurring between the antenna coils of overlapped tags.

5. The method according to claim 4, wherein the sweeping step sweeps the radio wave over a second predetermined frequency range including each resonant frequency of the at least one tag attached to a plurality of overlapped articles having at least one metal object.

6. The method according to claim 5, wherein the second predetermined range of frequencies includes a resonance frequency of each tag which varies based on a mutual inductance between the antenna coils of overlapped tags and the at least one metal object.

7. A system for identifying an article, comprising:

means for attaching to the article a tag having an antenna coil and a RFID element connected to the antenna coil;

means for activating the tag by transmitting a radio wave with which the at least one tag resonates from a transmitting/receiving antenna;

means for reading and writing data about the article to and from a memory of the RFID element; and means for sweeping the radio wave transmitted from said transmitting/receiving antenna over a first predetermined frequency range including each resonant frequency of the at least one tag attached to a plurality of overlapped articles, wherein the first predetermined range of frequencies includes a resonance frequency of each tag which varies based on a mutual inductance occurring between the antenna coils of overlapped tags.

8. The system according to claim 7, wherein the sweeping means sweeps the radio wave over a second predetermined frequency range including each resonant frequency of the at least one tag attached to a plurality of overlapped articles having at least one metal object.

9. The system according to claim 8, wherein the second predetermined range of frequencies includes a resonance frequency of each tag which varies based on a mutual inductance between the antenna coils of overlapped tags and the at least one metal object.

* * * * *